(12) United States Patent
Rauner et al.

(10) Patent No.: US 8,838,307 B2
(45) Date of Patent: Sep. 16, 2014

(54) MOTOR VEHICLE

(75) Inventors: Thomas Rauner, Blaubeuren (DE); Philipp Soell, Blaubeuren (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 582 days.

(21) Appl. No.: 13/086,824

(22) Filed: Apr. 14, 2011

(65) Prior Publication Data

US 2011/0270479 A1 Nov. 3, 2011

(30) Foreign Application Priority Data

Apr. 29, 2010 (DE) .................... 10 2010 018 753

(51) Int. Cl.
| | |
|---|---|
| B60L 9/00 | (2006.01) |
| B60K 26/02 | (2006.01) |
| B60K 6/52 | (2007.10) |
| B60K 6/445 | (2007.10) |
| B60W 10/06 | (2006.01) |
| B60W 10/08 | (2006.01) |
| B60W 20/00 | (2006.01) |

(52) U.S. Cl.
CPC .............. B60K 26/021 (2013.01); *B60K 6/445* (2013.01); *B60W 10/06* (2013.01); *B60W 10/08* (2013.01); *B60W 20/00* (2013.01); *Y02T 10/6286* (2013.01); B60K 6/52 (2013.01); *Y02T 10/6265* (2013.01)
USPC ................................... 701/22; 477/7; 701/51

(58) Field of Classification Search
CPC ..... B60W 20/00; B60W 10/08; B60W 10/06; Y02T 10/6286; B60K 6/445
USPC ........... 702/22; 477/3, 5, 107; 701/51, 36, 22, 701/103, 102, 55; 180/65.25, 65.23, 180/65.265, 165, 65.26, 65.285; 903/902, 903/910, 946; 60/698; 123/396; 475/150
See application file for complete search history.

(56) References Cited

U.S. PATENT DOCUMENTS

| | | | | |
|---|---|---|---|---|
| 6,295,487 | B1 * | 9/2001 | Ono et al. ........................ | 701/22 |
| 6,336,889 | B1 * | 1/2002 | Oba et al. ........................ | 477/5 |
| 7,520,358 | B2 | 4/2009 | Ehmanns et al. | |
| 7,761,211 | B2 * | 7/2010 | Hofmann ........................ | 701/51 |
| 2009/0017983 | A1 * | 1/2009 | Iwase et al. ..................... | 477/3 |
| 2009/0023530 | A1 * | 1/2009 | Iwase et al. ..................... | 475/150 |
| 2011/0112708 | A1 * | 5/2011 | Fassnacht ........................ | 701/22 |

FOREIGN PATENT DOCUMENTS

DE 10 2007 011 739 A 9/2009

* cited by examiner

*Primary Examiner* — Behrang Badii
(74) *Attorney, Agent, or Firm* — Gerald E. Hespos; Michael J. Porco; Matthew T. Hespos

(57) ABSTRACT

A motor vehicle has two drive units that can be operated jointly or individually to generate drive torque. The motor vehicle also has a device for predefining a driver's request. The device for predefining the driver's request is embodied so that a force level (K) with an increased restoring force is present within an adjustment range of the device. A control unit processes the driver's request and generates a control signal for actuating the drive units. The control unit operates so that, starting from a driving mode in which only one drive unit for generating a positive drive torque is active, switching over occurs from one drive unit to the other or the other drive unit also is activated when the force level is exceeded. At least one feature that characterizes the force level (K) can be varied based peripheral conditions.

10 Claims, 2 Drawing Sheets

MOTOR VEHICLE

CROSS-REFERENCE TO RELATED APPLICATION

This application claims priority under 35 USC 119 to German Patent Application No. 10 2010 018 753.4, filed on Apr. 29, 2010, the entire disclosure of which is incorporated herein by reference.

BACKGROUND OF THE INVENTION

1. Field of the Invention

The invention relates to a motor vehicle with two drive units that can be operated jointly or individually to generate drive torque. A device is provided for predefining a driver's request. A control unit processes the driver's request and generates a control signal for actuating the drive units 2. Description of the Related Art DE 10 2006 012 515 A1 describes a motor vehicle with an internal combustion engine and an electric machine that can be operated jointly or individually to generate drive torque. The motor vehicle has a device for predefining a driver's request and a control unit for processing the driver's request and for generating a control signal to actuate the internal combustion engine or the electric machine. The device for predefining the driver's request is embodied so that a force level with increased restoring force is present within the adjustment range of the device. The control unit is embodied so that, starting from a driving mode in which only the electric machine is active for generating a positive drive torque, switching over occurs from the electric machine to the internal combustion engine or the internal combustion engine also is activated when the force level is exceeded. The position of the force level can be changed automatically as a function of the charge state of the energy storage device that supplies the electric machine.

The object of the invention is to adapt the force level in an optimum way.

SUMMARY OF THE INVENTION

The invention relates to a motor vehicle with two drive units that can be operated jointly or individually to generate drive torque. The motor vehicle also has a device for predefining or inputting a driver's request. The device may be a throttle grip to which a restoring force is applied or an accelerator pedal to which a restoring force is applied. The device is embodied so that a force level with an increased restoring force is present within an adjustment range of the device. The motor vehicle also has a control unit for processing the driver's request and for generating a control signal for actuating the drive units. The control unit is embodied in so that, starting from a driving mode in which only one drive unit for generating a positive drive torque is active, switching over occurs from one drive unit to the other or the other drive unit also is activated when the force level is exceeded. At least one feature that characterizes the force level can be varied taking into account a multiplicity of peripheral conditions. Expressed in general terms, the invention is based on the realization that a plurality of individual situational peripheral conditions (which are referred to below individually) can change over time before and/or during a journey, and the threshold of the force feedback is to be correspondingly continuously adapted to make the maximum driving range in which the vehicle can be driven by only the first drive unit plausible for the driver.

The force level can be positioned at different adjustment travel points within the adjustment range of the device. The feature here is the position of the force level.

A limiting value of a vehicle operating parameter is determined at one or more times. Information about events and/or status variables that characterize the individual peripheral conditions is included in the calculation or determination of the limiting value. In this context, the feature is changed taking into account the limiting value, and the position of the force level may be set taking into account the limiting value. As a rule, the limiting value of the vehicle operating parameter is a combination of variables that are heavily dependent on the power level of the vehicle. In particular, the limiting value is determined so that when the vehicle operating parameter reaches the limiting value, the previously mentioned switching over from the corresponding operational control on the basis of predefined criteria is assessed as being beneficial and/or necessary. The switching over can be assessed, for example, as being beneficial if the overall efficiency of the vehicle can be increased by the switching over. The switching over also can be assessed, for example, as being necessary because the power requirements of the driver cannot be met, for example for increases over the exclusive operation of the electric motor.

The feature that characterizes the force level can be changed taking into account at least one of the following peripheral conditions:
  torque request by the driver,
  kinetic state of the vehicle (for example vehicle speed and/or acceleration),
  driving position,
  travel resistance (air resistance, rolling resistance etc.),
  road profile or route profile (such as, for example, the gradient of the roadway) and/or topography,
  operating state of the brake system (ensuring the supply of under pressure for boosting the braking force),
  switched-on state of loads of the vehicle on-board power system and/or rated power of the switched-on loads, and
  temperature of the high voltage battery.

A force feedback reacts immediately and sensitively to a change in the previously mentioned peripheral conditions.

One of the drive units may be an internal combustion engine, while the other drive unit may an electric machine.

The profile of the force level, above a value (for example the accelerator pedal angle) that represents a measure for adjustment, may have a first section with a more linear and/or flatter profile than a following second section of the profile of the force level. As a result, the range within which purely electric travel is possible or appropriate or expedient at a particular time (i.e. the vehicle is driven only by an electric motor without an internal combustion engine) is represented in a plausible way to the driver.

DETAILED DESCRIPTION OF THE PREFERRED EMBODIMENT

Figure 1:
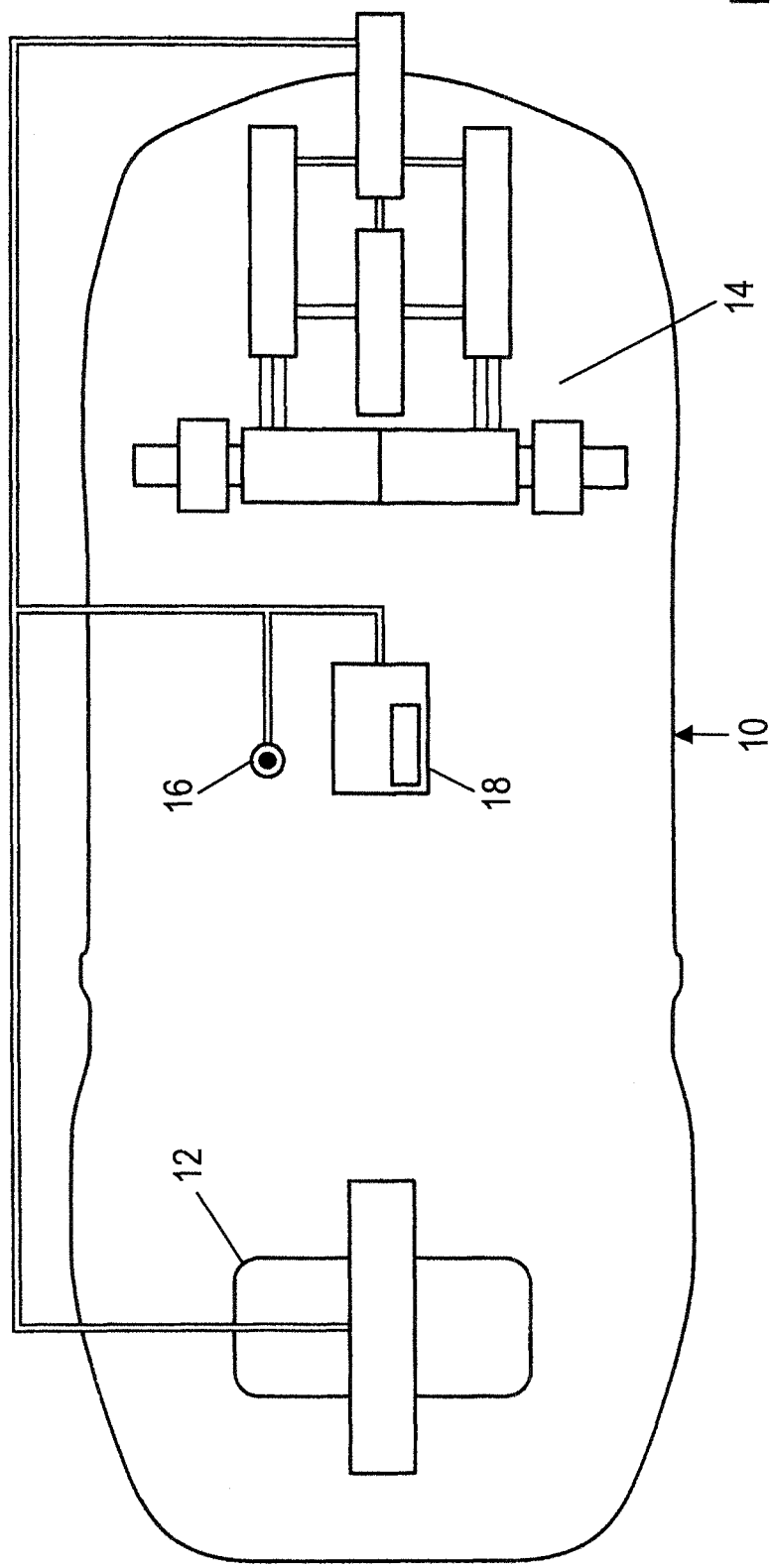
FIG. 1 is a schematic illustration of a vehicle in accordance with the subject invention.

A vehicle in accordance with the invention is identified by the numeral 10 in FIG. 1. The vehicle 10 has two drive units, namely, an electric machine 12 and an internal combustion engine 14 that can be operated individually or jointly for generating torque to drive the vehicle 10. The vehicle 10 also has a device 16 for predefining or inputting a driver's request. The device 16 may be a throttle grip to which a restoring force is applied or an accelerator pedal to which a restoring force is applied. The device 16 is embodied so that a force level with an increased restoring force is present within an adjustment range of the device. The motor vehicle 10 also has a control unit 18 for processing the driver's request input at the device 16 and for generating a control signal for actuating at least one of the drive units 12, 14.

Figure 2:
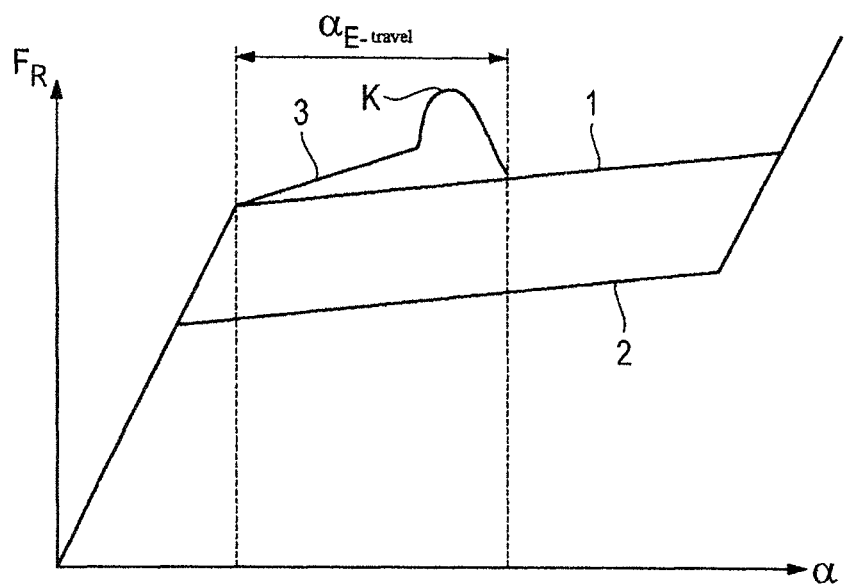
FIG. 2 is a schematic illustration of the force profile of the restoring force FR plotted against the accelerator pedal angle $\alpha$ in a force feedback pedal (the term used in the English literature) in the range $\alpha_{E\text{-}travel}$ in the purely electric travel mode, wherein this range according to a value of zero, cannot be present either.

FIG. 2 is a schematic illustration of the force profile of the restoring force FR plotted against the accelerator pedal angle α in a force feedback pedal in the range $\alpha_{E\text{-}travel}$ in the purely electric travel mode. The characteristic curve has the profile of a hysteresis and comprises an upper characteristic curve section 1 that illustrates the force profile (with increased restoring force) for the deflection in the direction of relatively large accelerator pedal angles. Correspondingly, a lower characteristic curve section 2 illustrates the force profile (with reduced restoring force at the same respective pedal angle) for the retraction of the accelerator pedal in the direction of relatively small accelerator pedal angles. In this context, the characteristic curve is embodied (for example of software programming) so that a force level K is impressed at a predetermined accelerator pedal angle $\alpha_{threshold}$.

The vehicle is driven in the purely electric drive mode (only by the electric motor) in an accelerator pedal angle range below the force level. Above the force level, the vehicle is driven either in a mixed drive mode, in which the internal combustion engine and the electric motor drive the vehicle, or in a purely internal combustion engine drive mode in which the vehicle is driven only by the internal combustion engine.

The position of the force level can be changed on the characteristic curve between small and large accelerator pedal angles taking into account parameters that bring about a request for additional activation of the internal combustion engine and/or can be included in the decision of an operational controller to bring about additional activation of the internal combustion engine.

Parameters include, for example, the gradient of the roadway, the driver's request for a torque, the driving position, the vehicle speed, the number of loads in the on-board power system that are active at a particular time, at least one brake system parameter that describes the operating state of the brake system, the temperature of the high voltage battery etc.

The force threshold that is implemented by the force feedback pedal therefore can be adapted on the accelerator pedal characteristic curve or by means of the accelerator pedal angle, at any time to the maximum range within which purely electric travel is possible at a particular time.

The transition from purely electric travel to additional activation of the internal combustion engine is determined in the calculation by means of all the involved parameters and therefore can be assured precisely with respect to the driver.

The force threshold should represent in a plausible way the maximum range in which purely electric travel is possible. For this purpose, the profile is configured in the manner of a continuously rising ramp 3 (linear section) with final pressure point for generating the E (electric) travel threshold. The comprehensible E travel limit can be made particularly plausible to the driver by means of such a linear rise in force which is described by the ramp and a subsequent force threshold.

What is claimed is:

1. A motor vehicle comprising:
   first and second drive units that can be operated jointly or individually to generate drive torque
   a device for predefining a driver's request, the device being a throttle grip to which a restoring force is applied or an accelerator pedal to which a restoring force is applied, the device being movable within an adjustment range and being embodied so the restoring force is different at different positions within the adjustment range of the device pursuant to a force profile curve; and
   a control unit for processing the driver's request and for generating a control signal for actuating the drive units, the control unit being embodied so that, starting from a driving mode in which only the first drive unit is active for generating a positive drive torque, switching over occurs from first drive unit to the second drive unit or the second drive unit also is activated when the force level is exceeded, the control unit further being operative to change the force profile curve based on at least one of a plurality of peripheral conditions.

2. The motor vehicle of claim 1, wherein the force level can be positioned at different adjustment travel points within the adjustment range of the device, and the feature is the position of the force level.

3. The motor vehicle of claim 1, wherein a limiting value of a vehicle operating parameter is determined at least at one time, wherein information about events or status variables that characterize the individual peripheral conditions is included in calculating the limiting value and when the feature is changed taking into account the limiting value.

4. The motor vehicle of claim 1, wherein the peripheral conditions include at least one of a:
   torque request by the driver,
   kinetic state of the vehicle,
   driving position,
   travel resistance,
   road profile or route profile or topography,
   operating state of a brake system,
   switched-on state of loads of a vehicle on-board power system and/or rated power of switched-on loads, and
   temperature of a high voltage battery.

5. The motor vehicle of claim 1, wherein the first drive unit is an electric machine, and the second drive unit is an internal combustion engine.

6. The motor vehicle of claim 1, wherein above a value that represents a measure for the adjustment, the force level has a significantly more linear or flatter profile in a first section than in a following second section.

7. A motor vehicle comprising:
   an electric machine and an internal combustion engine that can be operated jointly or individually to generate drive torque;
   an accelerator pedal that can be adjusted angularly by a driver within an adjustment range to input a driver's request and to which a restoring force is applied, the accelerator pedal being embodied so that the restoring force is different at different angular positions within the adjustment range of the accelerator pedal pursuant to a force profile curve; and
   a control unit for processing the driver's request and for generating a control signal for actuating at least one of the electric machine and an internal combustion engine, the control unit being embodied so that, starting from a driving mode in which only the electric machine is active for generating a positive drive torque, switching over at least partly to the internal combustion engine occurs when the force level is exceeded, the control unit further being embodied to receive inputs relating to a plurality of peripheral conditions and to vary the force profile curve based on at least one of the plurality of peripheral conditions.

8. The motor vehicle of claim 7, wherein the peripheral conditions include at least one of a:
   torque request by the driver,
   kinetic state of the vehicle,
   driving position,
   travel resistance,
   road profile or route profile or topography,
   operating state of the brake system,
   switched-on state of loads of a vehicle on-board power system and/or rated power of switched-on loads, and
   temperature of a high voltage battery.

9. A method for operating a motor vehicle that has an electric machine and an internal combustion engine that can be operated jointly or individually to generate driving torque, the method comprising:
   generating the driving torque by the electric machine based on an angle of an accelerator pedal set by a driver;
   applying a restoring force to the accelerator pedal that varies in accordance with the angle of accelerator pedal, the restoring force varying pursuant to a force profile curve that defines restoring forces for each of the angles of the accelerator pedal;
   measuring a plurality of peripheral conditions;
   sensing the angle of the accelerator pedal set by a driver;
   varying the force profile curve based on the measured peripheral conditions; and
   switching over at least partly to the internal combustion engine if a force level applied by the driver to the accelerator pedal exceeds the restoring force defined by the force profile curve.

10. The method of claim 9, wherein the step of measuring a plurality of peripheral conditions comprises measuring at least one of a:
   torque request by the driver,
   kinetic state of the vehicle,
   driving position,
   travel resistance,
   road profile or route profile or topography,
   operating state of the brake system,
   switched-on state of loads of a vehicle on-board power system and/or rated power of switched-on loads, and
   temperature of a high voltage battery.

* * * * *